US006915030B2

(12) United States Patent
Svilans et al.

(10) Patent No.: US 6,915,030 B2
(45) Date of Patent: Jul. 5, 2005

(54) OPTICAL SPECTRUM ANALYZER

(76) Inventors: Mikelis Nils Svilans, 84 Kenins Crescent, Kanata, Ontario (CA), K2K 3E5; Philip Duggan, 1158 RockyHarbour Cres, Ottawa,Ontario (CA), K1V 1V1; Paul Colbourne, 6 Bren-Maur Road, Nepean, Ontario (CA), K2J 3Z7

( * ) Notice: Subject to any disclaimer, the term of this patent is extended or adjusted under 35 U.S.C. 154(b) by 28 days.

(21) Appl. No.: 10/705,866

(22) Filed: Nov. 13, 2003

(65) Prior Publication Data

US 2004/0096151 A1 May 20, 2004

Related U.S. Application Data

(60) Provisional application No. 60/426,389, filed on Nov. 15, 2002.

(51) Int. Cl.[7] .................................................. G02B 6/12
(52) U.S. Cl. ............................. 385/14; 385/24; 385/31
(58) Field of Search ............................. 385/14, 24, 31, 385/37, 2, 8, 9, 13, 15, 17, 39

(56) References Cited

U.S. PATENT DOCUMENTS

| 5,617,234 A | * | 4/1997 | Koga et al. ................... 398/14 |
| 2001/0031113 A1 | * | 10/2001 | Frish et al. .................... 385/24 |
| 2002/0015554 A1 | * | 2/2002 | Oguma et al. ................. 385/24 |
| 2004/0033004 A1 | * | 2/2004 | Welch et al. .................. 385/14 |
| 2004/0208428 A1 | * | 10/2004 | Kikuchi et al. ............... 385/24 |

* cited by examiner

Primary Examiner—K. Cyrus Kianni
(74) Attorney, Agent, or Firm—Teitelbaum & MacLean; Neil Teitelbaum; Doug MacLean

(57) ABSTRACT

An optical spectrum analyzer for analyzing at least n wavelengths of light is disclosed having a tunable filter with an input port and an output port and a periodic output response with a free spectral range $F_{SR}$ and having a bandwidth B. An AWG is optically coupled to receive light from the output port; and for distributing the light spatially at other locations in a wavelength dependent manner. Optically coupled with the AWG are m detectors for detecting wavelength or channel information. The number of detectors, m is less than n when a single detector is associated with a single channel; and m is less than 2n when two detectors are associated with a single channel.

14 Claims, 2 Drawing Sheets

OPTICAL SPECTRUM ANALYZER

CROSS-REFERENCE TO RELATED APPLICATIONS

This application claims priority of U.S. Provisional Patent Application No. 60/426,389 filed Nov. 15, 2002, entitled "Optical Spectrum Analyzer using Tunable Filter plus AWG" which is incorporated herein by reference for all purposes.

FIELD OF THE INVENTION

The present invention relates to an apparatus and a method for detecting channel information; and, more particularly a method for monitoring channel status or detecting location and a number of working channels from a wavelength division multiplexed (WDM) signal or for determining within limits, the wavelength or wavelengths of light of an incoming optical signal without requiring wavelength selective photodetectors.

BACKGROUND

When managing, maintaining and monitoring the performance of an optical network it is important to know the status of individual channels. Switching and recovering operations should be rapidly performed in accordance with a channel status when there is an error in an optical network, as information is transmitted through transmission channels at very high speeds, for example 10 Gbps or more than 10 Gbps. Thus, the status information for each channel should be monitored rapidly, and correctly and in an economical way. Channel monitors and optical spectrum analyzers are well known in the art. Some optical spectrum analyzers are capable of scanning through a series of channels and analyzing a single channel at a time; others, are capable of processing more than one channel at a time. Some spectrum analyzers can be configured to monitor networks of channels and provide information about a wavelength of one or more channels or can be configured to provide information regarding the presence or absence of particular channels.

One spectrum analyzer is described U.S. Pat. No. 5,617,234 issued Apr. 1, 1997 in the name of Koga et al. discloses a multi-wavelength simultaneous monitoring circuit capable of precise discrimination of wavelengths of a wavelength division multiplexed (WDM) signal, and suitable for optical integrated circuits having large resistance to vibration. The device proposed by Koga is an arrayed waveguide grating (AWG) based device having photo detectors coupled to output ports of the AWG. Although Koga's device shares certain similarities with the invention described hereafter, it is believed that this invention provides a low cost spectrum analyzer that requires fewer costly detectors while providing adequate response time.

Since spectrum analyzers can provide varied functionality, it is desired to have one which requires low power, and which is compact and robust.

It is an object of this invention to provide a device for acquiring wavelength information for a plurality of channels having different center wavelengths, and wherein the device requires substantially fewer photo detectors than the number of channels it can resolve.

It is an object of this invention, an optical spectrum analyzer is provided that yields wavelength information about one or more channels simultaneously, or can be used in a more general sense to provide status information regarding the presence or absence of one or more channels from a group of channels.

SUMMARY OF THE INVENTION

In accordance with the invention, an optical spectrum analyzer for analyzing at least n wavelengths of light is provided, comprising:
- a tunable filter having an input port and an output port and a periodic output response with a free spectral range $F_{SR}$ and having a bandwidth B;
- an AWG optically coupled to receive light from the output port; and for distributing the light spatially at other locations in a wavelength dependent manner, and,
- a plurality of m detectors optically coupled with the AWG for detecting wavelength or channel information, wherein m<n when a single detector is associated with a single wavelength and wherein m<2n when two detectors are associated with a single wavelength.

In accordance with the invention, there is further provided, an optical spectrum analyzer comprising:
- a resonator for receiving an input optical signal and for providing an output optical signal having an output response that is substantially periodic in intensity with respect to wavelength such that light within a first group of spaced channels is substantially attenuated while simultaneously a second group of spaced channels are substantially un-attenuated, said second group of channels being substantially periodically spaced in wavelength;
- an array of m detectors, for detecting the light within the second group of periodically spaced channels; and,
- an arrayed waveguide grating having an input port for receiving the output signal from the resonator and having at least m/2 output ports to provide m/2 output signals to at least m/2 distinct locations, light provided to the m/2 distinct locations being optically coupled with the m detectors.

In accordance with another aspect of the invention, there is provided, a method of providing wavelength information related to an optical signal having a plurality of channels of information encoded therein, wherein each channel has a center wavelength spaced from an adjacent channel, the method comprising the steps of:
- a. launching a multiplexed optical signal including the plurality of channels of information into a tunable periodic filter to yield a periodic signal wherein a first group of the channels are discernable from others;
- b. receiving the periodic signal and spatially demultiplexing the first group of channels;
- c. detecting with an array of spatially separated detectors information related to the first group of channels;
- d. tuning the tunable filter to yield a second periodic signal, wherein a second group of channels is discernable from the first group;
- e. receiving the second periodic signal and spatially demultiplexing the second group of channels; and,
- f. detecting with the array of detectors information related to the second group of channels, wherein same detectors used in step (c) are used in step (f) for detecting.

BRIEF DESCRIPTION OF THE DRAWINGS

Exemplary embodiments of the invention will be described in accordance with the drawings in which.

DETAILED DESCRIPTION OF THE INVENTION

Figure 1:
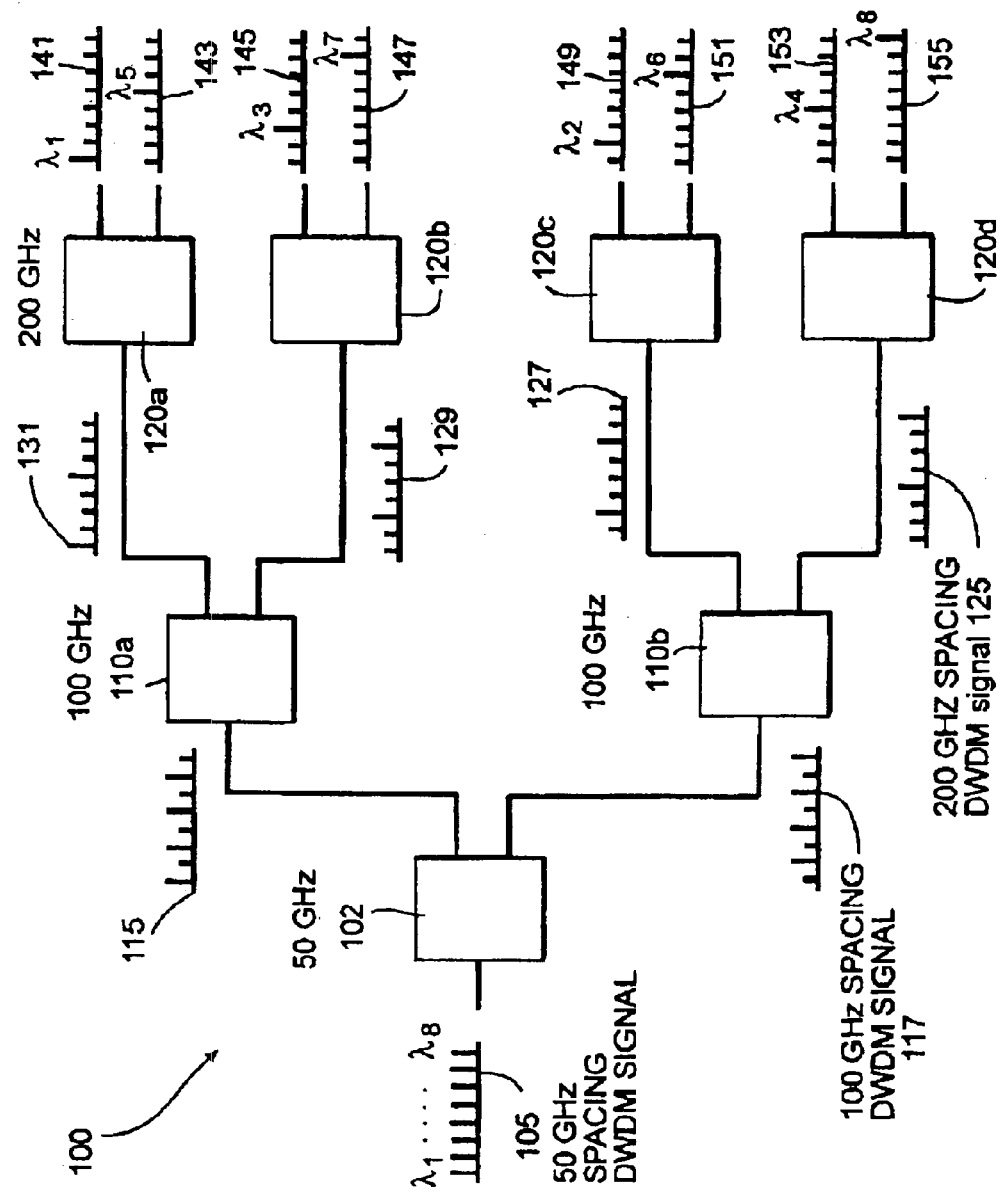
FIG. 1 is a drawing of a prior art optical filter illustrating the demultiplexing an input signal having 50 GHz channel spacing and having output signals with 200 GHz spacing.

Prior art FIG. 1 illustrates a demultiplexing system wherein densely multiplexed channels are demultiplexed simultaneously using successive demultiplexors. By way of this arrangement, separate detectors would be required for each demultiplexed channel, thereby requiring n detectors to detect n channels of information.

Figure 2:
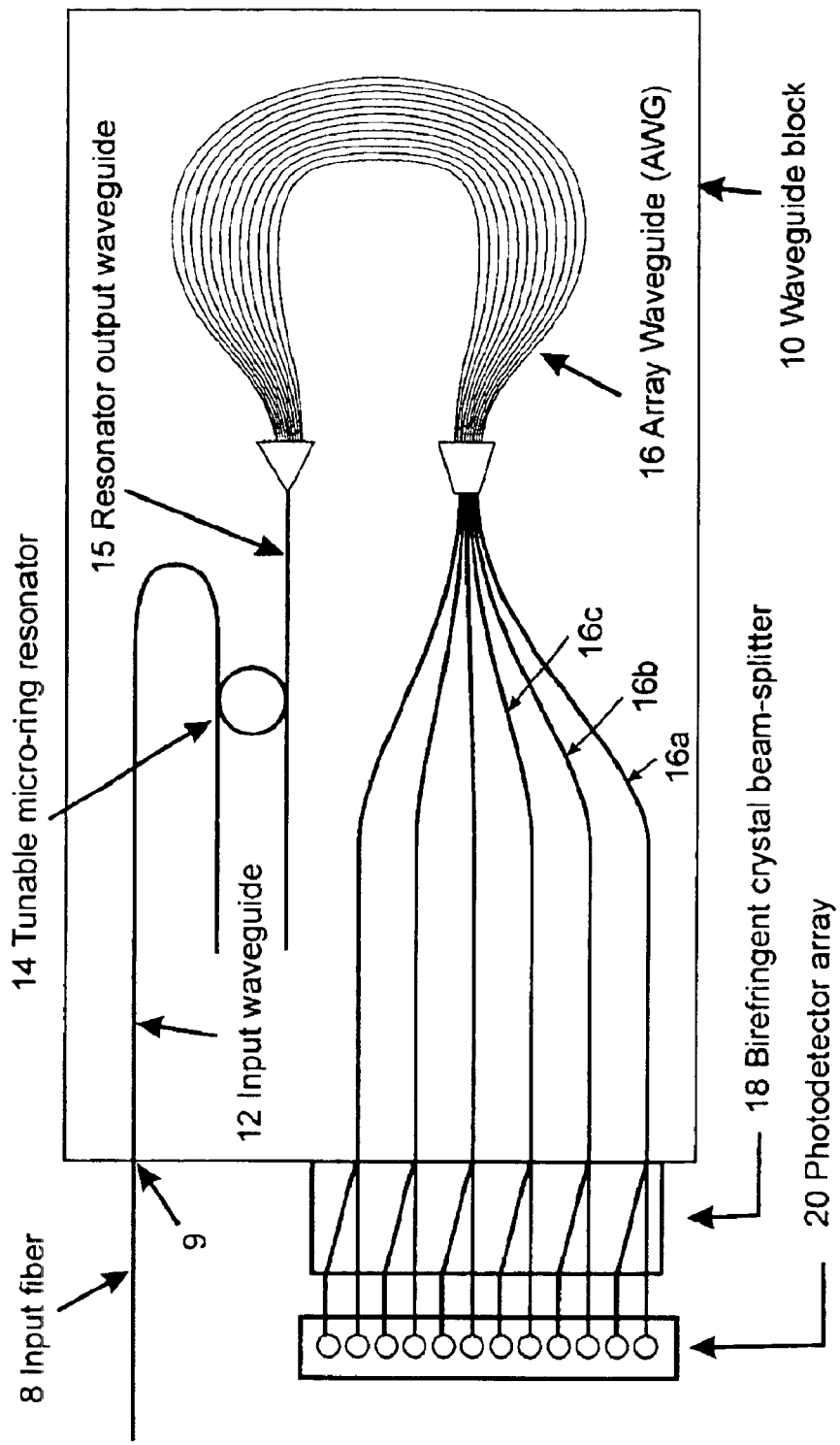
FIG. 2 is a drawing of a spectrum analyzer in accordance with the invention fabricated within a planar substrate having waveguides thereon.

Turning now to FIG. 2 a spectrum analyzer is shown, having an input optical fiber 8 coupled to an end 9 of a waveguide block 10 for launching a signal to be analyzed therein.

The optical fiber 8 is optically coupled to an input waveguide 12 at an edge of the waveguide block 10. A microlens not shown can be provided at the end of the optical fiber 8 or alternatively the end of fiber 8 may have its core thermally expanded to lessen coupling losses between fiber 8 and the waveguide 12. The coupling receiving end of the waveguide 12 can also have its core expanded to match the fiber 8 or may have a microlens formed within the end.

A tunable waveguide periodic filter in the form of a tunable ring resonator 14 is disposed to receive the light propagating along the waveguide 12 and to filter the light so as to provide an output signal having a spectrum that is a substantially periodic as a function of wavelength in output waveguide 15. A resistance heater (not shown) is provided adjacent to the ring resonator 14 for controllably varying its optical path length thereby varying the FSR only slightly allowing the output to vary in such a manner so as to provide a different group of channels at its output. For example, in an unheated state, the ring resonator may output channels 1, 6, 11, and 16, and after being heated a predetermined amount, may output channels 2, 7, 12, and 17; the heater thereby providing a means of controlling which groups of output channels are selected for detection. Alternatively, this periodic filtering function could be performed by a switch or switches used for switching groups of channels 1, 6, 11 followed by 2,7, and 12, followed by 3, 8, and 13, etc. This embodiment would be more complex and likely more costly than utilizing an etalon or a ring resonator to provide a periodic output response with wavelength.

On block 10, an integrated arrayed waveguide grating (AWG) 16 is shown disposed in a horseshoe configuration, for spatially resolving and demultiplexing the incoming periodic stream of input signals received from the output end of the ring resonator 14. In the embodiment shown in FIG. 2 the AWG has m/2 output waveguides, only a few of which are illustrated, for clarity, 16a, 16b, and 16c. Conveniently, in this configuration, the input waveguide 12 and the output waveguides 16a, 16b, and 16c are all disposed at a same end of the device, which is preferable for a more convenient less expensive package. For example, hermetically sealing a package with leads at only one end is more convenient and generally results in a more reliable device.

A birefringent crystal beam-splitter (BCB) 18 is coupled to an end face of the block 10 for polarization demultiplexing signals carried on the output waveguides 16a, 16b and 16c into two linearly orthogonal polarized signals for each signal carried on each of the output waveguides. Hence m linearly polarized output signals can be provided. The BCB 18 is optional and is not required when specific information regarding the polarization is not required. Of course the advantage of examining the power in each polarization component is to have the analyzer provide a result, which normalizes for or cancels the polarization dependence of the waveguide components.

In FIG. 2, an array of m detectors is optically coupled to the birefingent crystal, wherein m<2n when two detectors are associated with a single AWG output waveguide e.g. 16a. In the instance where the BCB 18 is not provided, there is only one detector associated with a single AWG output waveguide, e.g. 16a, m<n. It should be noted that when optical signals corresponding to channels 1, 6, and 11 for example, are output by the tunable ring resonator 14 at time t1, these channels can share waveguides respectively, with signals corresponding to channels 2, 7, and 12 output at a later time t2. By time multiplexing and sharing detectors in this manner, fewer detectors (m) are required than the number of channels (n) the system can put through or process.

By way of example, the tunable ring resonator 14 has an FSR of 500 GHz, which covers the C-band of approximately 5000 GHz with up to 50 channels separated by 100 GHz. In this instance at least 10 output detectors are required. Notwithstanding, there are several different AWG configurations that can be provided; for example, AWG output ports or waveguides could be segmented into 13 groups of 400 GHz wide spectrally, for providing 5200 GHz of total wavelength coverage and free spectral range greater than 5200 GHz. Thus, when optical signals corresponding to channels 1, 6, 11, 16, ..., 46 for example, are output by the tunable ring resonator 14, they appear on the AWG outputs 1, 2, 3, 4, 6, 7, 8, 9, 11 and 12 respectively. Now when the ring resonator is tuned to pass channels 2, 7, 12, ..., 47, they will appear on AWG outputs 1, 2, 3, 5, 6, 7, 8, 10, 11 and 12 respectively. This tuning continues until the channel 1 reappears on AWG output 1 and the cycle is complete.

Alternatively, the AWG could have 14 outputs each 200 GHz wide. Note that the AWG FSR is not a multiple of the tunable filter FSR. Therefore only one resonance peak of the tunable filter will transmit to output number 1 of the AWG, for example allowing >5200 GHz total wavelength range. In this case, when optical signals corresponding to channels 1, 6, 11, 16, ..., 46 for example, are output by the tunable ring resonator 14, they appear on the AWG outputs 1, 3, 6, 8, 11, 13, 2, 4, 7 and 9 respectively. Now when the ring resonator is tuned to pass channels 2, 7, 12, ..., 47, they will appear on AWG outputs 1, 4, 6, 9, 11, 14, 2, 5, 7 and 10 respectively. This tuning continues until the channel 1 reappears on AWG output 1 and the cycle is complete. Other combinations of AWG channel spacing and FSR are possible.

In operation, polarization splitting, by utilizing the birefringent crystal block 18, to eliminate polarization-dependent loss (PDL) works by separately detecting the TE and TM polarizations. In most instances the two polarizations will experience different polarization dependent losses (PDL) and different polarization dependent wavelength responses (PDλ) through the tunable filter 14 and through the AWG 16 due to birefringence and asymmetry in the waveguides. Notwithstanding it is possible to calibrate the two linearly orthogonal TE and TM responses separately. The measured data can then be adjusted before combining the TE and TM responses to obtain the total input spectral distribution (TE+TM). Optical spectrum analyzer (OSA) type applications require very low PDL (<0.2 dB) and PDλ (<2 GHz), which would be difficult or impossible to meet with existing waveguide technology without some PDL mitigation scheme such as proposed here. Other polarization splitting arrangements could be envisaged, for example using waveguide polarization splitters instead of the birefringent block 18, or placing the polarization splitting function at the input and having two tunable filters 14 and two AWG's 16, one for each polarization. The use of waveguide polarization splitters would allow fiber coupling of the outputs using standard optical fiber, if it is desired to have the detectors remote from the waveguide. Yet another polarization splitting alternative is to use polarization maintaining fiber at the outputs or input(s), and to use fiber optic polarization beamsplitters.

It should be noted that the output ports of the AWG 16 can be actual waveguides or can be locations at an edge of the AWG coupled with detectors.

What is claimed is:

1. An optical spectrum analyzer for analyzing at least n wavelengths of light comprising:
    a tunable filter having an input port and an output port and a periodic output response with a free spectral range $F_{SR}$ and having a bandwidth B;
    an AWG optically coupled to receive light from the output port; and for distributing the light spatially at other locations in a wavelength dependent manner, and,
    a plurality of m detectors optically coupled with the AWG for detecting wavelength or channel information, wherein m<n when a single detector is associated with a single wavelength and wherein m<2n when two detectors are associated with a single wavelength.

2. An optical spectrum analyzer as defined in claim 1, wherein the bandwidth of each output of the AWG is less than $F_{SR}$.

3. An optical spectrum analyzer as defined in claim 2, wherein the tunable filter has a wavelength range R>$F_{SR}$ and wherein the plurality of detectors m is at least R/$F_{SR}$, and wherein R/$F_{SR}$<R/B.

4. An optical spectral analyzer as defined in claim 3 wherein the tunable filter is a ring resonator formed on a planar substrate.

5. An optical spectral analyzer as defined in claim 4 wherein the tunable filter is a ring resonator formed on a planar substrate wherein the input port on the tunable filter and the detectors are at a same end of a planar waveguide.

6. An optical spectrum analyzer as defined in claim 1, wherein the tunable filter is a resonator for receiving an input optical signal and for providing an output optical signal having an output response that is periodic in intensity with respect to wavelength such that an input light signal comprising a plurality of multiplexed channels is output such that a first group of spaced channels is substantially attenuated while simultaneously a second group of spaced channels are substantially unattenuated, said second group of channels being periodically spaced in wavelength.

7. An optical spectrum analyzer as defined in claim 6, wherein the resonator is a ring resonator.

8. An optical spectrum analyzer as defined in claim 6, wherein the resonator and the AWG are disposed within a planar substrate.

9. An optical spectrum analyzer as defined in claim 6, wherein the resonator and the AWG are disposed within a same planar substrate.

10. An optical spectrum analyzer as defined in claim 6, wherein the resonator is tunable by varying a temperature about the resonator.

11. An optical spectrum analyzer as defined in claim 10, further comprising a controllable heater thermally coupled with the resonator.

12. An optical spectrum analyzer as defined in claim 6, wherein the plurality of detectors m are for detecting the light within the second group of periodically spaced channels; and wherein the m detectors are positioned to detect at least n output signals having centre wavelengths at n distinct locations, wherein n<m.

13. An optical spectrum analyzer as defined in claim 1, wherein the tunable filter is responsive to a controller for demultiplexing a multiplexed input signal into separate channels in such a manner as to provide at different instants in time, pluralities of groups of different channels spaced in wavelength to said plurality of detectors simultaneously, such that a first group of spaced channels are provided to said plurality of detectors at a time t1, and a second group of different channels having a substantially same wavelength spacing are detected at a time t2, where t1 is not equal to t2.

14. An optical spectrum analyzer as defined in claim 1, further comprising a polarization beam splitter for splitting output signals into linearly orthogonally polarized beams when two detectors are associated with a single wavelength.

* * * * *